United States Patent
Simpson et al.

(10) Patent No.: US 6,661,952 B2
(45) Date of Patent: Dec. 9, 2003

(54) SUB-WAVELENGTH EFFICIENT POLARIZATION FILTER (SWEP FILTER)

(75) Inventors: Marcus L. Simpson, Knoxville, TN (US); John T. Simpson, Knoxville, TN (US)

(73) Assignee: UT Battelle, LLC, Oak Ridge, TN (US)

( * ) Notice: Subject to any disclaimer, the term of this patent is extended or adjusted under 35 U.S.C. 154(b) by 42 days.

(21) Appl. No.: 09/849,806

(22) Filed: May 4, 2001

(65) Prior Publication Data

US 2002/0164105 A1 Nov. 7, 2002

(51) Int. Cl.$^7$ ................................................. G02B 6/34
(52) U.S. Cl. ........................................... 385/37; 385/11
(58) Field of Search ................................ 385/11, 37, 27

(56) References Cited

U.S. PATENT DOCUMENTS

| | | | | |
|---|---|---|---|---|
| 5,160,358 A | * | 11/1992 | Kondo et al. | 65/395 |
| 5,216,680 A | * | 6/1993 | Magnusson et al. | 372/20 |
| 5,479,544 A | * | 12/1995 | Ono et al. | 385/37 |
| 5,515,461 A | * | 5/1996 | Deri et al. | 385/27 |
| 5,598,300 A | * | 1/1997 | Magnusson et al. | 359/566 |
| 5,724,463 A | * | 3/1998 | Deacon et al. | 385/27 |
| 6,035,089 A | * | 3/2000 | Grann et al. | 385/129 |
| 6,055,262 A | * | 4/2000 | Cox et al. | 372/96 |
| 6,154,480 A | * | 11/2000 | Magnusson et al. | 372/96 |
| 6,215,928 B1 | * | 4/2001 | Friesem et al. | 385/37 |
| 6,355,393 B1 | * | 3/2002 | Hirai et al. | 430/139 |
| 6,532,326 B1 | * | 3/2003 | Hutchinson et al. | 385/37 |

OTHER PUBLICATIONS

Grann et al. entitled "Subwavelength Structured Narrow-Band Integrated Optical Grating Filters", 1998 diffractive optic and micro conference, Kailua, HI (United States), Jun. 8–12, 1998 DE98003389.

Weber et al. entitled "Giant Birefringent Optics in Multilayer Polymer Mirrors", Science 287 (5462):2451.

ERID 0818 by Hutchinson, et al. entitled "Transverse–Longitudinal Integrated Resonator" filed Sep. 21, 2000.

* cited by examiner

Primary Examiner—Michael P. Stafira
Assistant Examiner—Juan D Valentin, II
(74) Attorney, Agent, or Firm—Akerman Senterfitt

(57) ABSTRACT

A polarization sensitive filter includes a first sub-wavelength resonant grating structure (SWS) for receiving incident light, and a second SWS. The SWS are disposed relative to one another such that incident light which is transmitted by the first SWS passes through the second SWS. The filter has a polarization sensitive resonance, the polarization sensitive resonance substantially reflecting a first polarization component of incident light while substantially transmitting a second polarization component of the incident light, the polarization components being orthogonal to one another. A method for forming polarization filters includes the steps of forming first and second SWS, the first and second SWS disposed relative to one another such that a portion of incident light applied to the first SWS passes through the second SWS. A method for separating polarizations of light, includes the steps of providing a filter formed from a first and second SWS, shining incident light having orthogonal polarization components on the first SWS, and substantially reflecting one of the orthogonal polarization components while substantially transmitting the other orthogonal polarization component. A high Q narrowband filter includes a first and second SWS, the first and second SWS are spaced apart a distance being at least one half an optical wavelength.

34 Claims, 4 Drawing Sheets

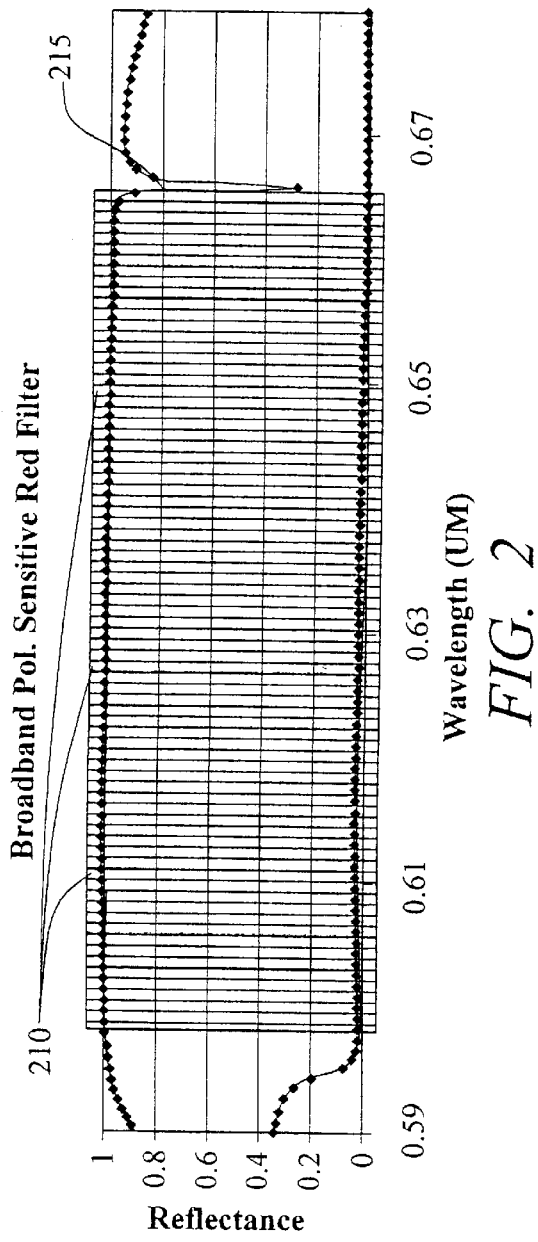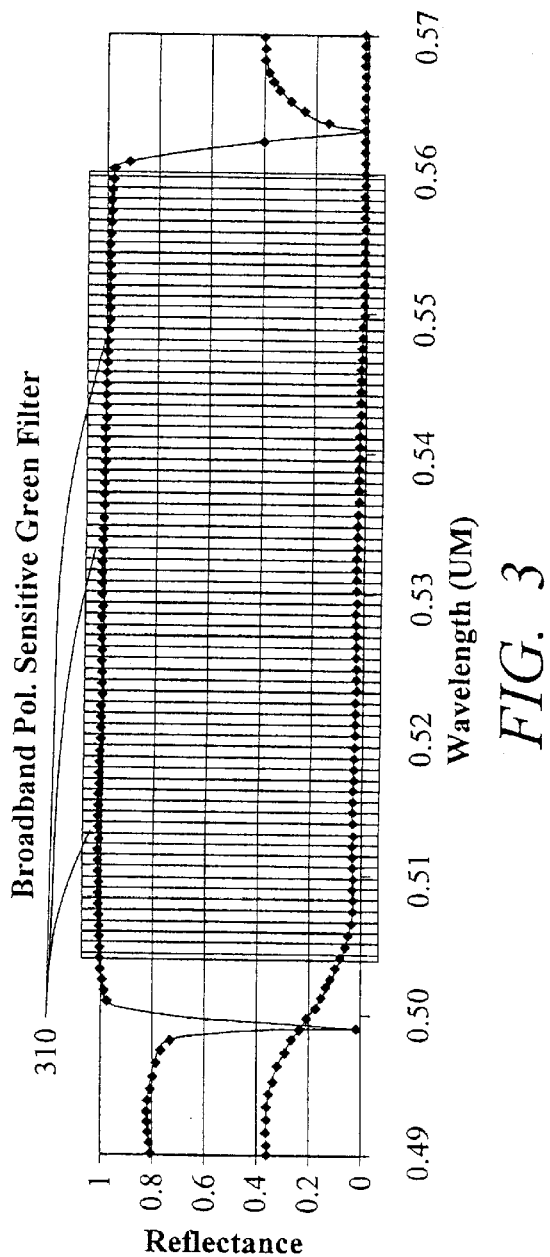

SUB-WAVELENGTH EFFICIENT POLARIZATION FILTER (SWEP FILTER)

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

FIELD OF THE INVENTION

This invention relates generally to a method and apparatus for separation of light having more than one polarization.

BACKGROUND

Polarization sensitive materials have been used for many years, in a variety of applications. Polarization sensitive materials refer to the selective transmission or reflection of light from a material based on the polarization state of the light. A common method of producing polarized light is through the use of dichroic polarizing materials. The most common dichroic polarizing material is manufactured by assembling a plurality of long, parallel polymer chains. This type of polarizing filter nearly completely absorbs light which has its electric field vector parallel to the length of the polymer chains, while only partially absorbing light that has its electric field vector perpendicular to the length of the polymer chains. Thus, a polarizing filter formed from an oriented polymer chain material absorbs a significant amount of incident light from an unpolarized light source, making them low efficiency polarizing filters. Accordingly, these materials are generally unusable for high optical power applications.

Other transmission polarizing techniques take advantage of the fact that at a certain angle of incidence (i.e. Brewster's angle), only one polarization state (TE mode) is partially reflected while the other state (TM mode) is completely transmitted. Polarizing beamsplitters are in this class of polarizers. These polarizing filters are difficult to fabricate as they require light to strike a surface at a specific angle of incidence. Moreover, these filters are only moderately efficient.

High efficiency, frequency selective, reflective, optical filters (mirrors) are typically constructed from quarter wave stacks of high and low refractive index dielectric materials. Such stacks are polarization insensitive at normal incidence and become increasingly polarization sensitive at higher incident angles.

In order to select, or filter, one polarization state from an optical beam having both polarization states, current optical systems generally includes a bulky polarizing beam splitter positioned in the beam path. Beam splitters add considerable bulk and are known to introduce significant optical aberrations in optical signals when they are used.

SUMMARY

A polarization filter includes a first sub-wavelength resonant grating structure (SWS) for receiving incident light and a second SWS. The SWS are disposed relative to one another such that a portion of incident light applied to the first SWS passes through the second SWS. The combination of two SWS being optically connected produce a strong, polarization dependent, resonance. As a result, incident light is either strongly reflected or transmitted, depending on the polarization state of the incident light.

The polarization sensitive resonance of the filter substantially reflects a first polarization component of incident light while substantially transmitting a second polarization component of incident light, the polarization components being orthogonal to one another. This resonance condition can hold over a broad band of wavelengths. In one embodiment, the first and second SWS are spaced apart a distance being less than one half an optical wavelength. However, in an alternate embodiment, the first and second SWS are spaced apart a distance greater than one half an optical wavelength, thus creating a high Q narrowband filter. For most efficient operation, incident light can be directed substantially normal to the surface of the filter.

Each SWS can be formed from respective pluralities of sub-wavelength features, the plurality of features being disposed in respective dielectric waveguide materials. The features preferably have a higher refractive index as compared to the respective waveguide materials. The plurality of features can be embedded in the waveguides.

Each SWS can be formed from features having a length dimension and a shorter width dimension, the features disposed in respective waveguide materials. The SWEP filter can reflect substantially all incident light over a range of wavelengths if the electric field vector of the incident light is parallel to the length dimension of the features. If the electric field vector of the incident light is perpendicular to the feature lengths, substantially all incident light will substantially be transmitted over the same bandwidth of wavelengths. If unpolarized light is normally incident on the SWEP filter, then approximately half the light is reflected with one polarization and approximately half the light is transmitted with the other orthogonal polarization component.

The filter can be configured to have a pixelated surface, the filter having a plurality of areas defining a plurality of pixels. Pixels can each be adapted to produce a configurable resonant reflective response.

The resonant reflective response of the filter can also be modulated by including a structure for modulation. The structure for modulation can include at least one electro-optic layer, the electro-optic layer disposed in optical contact with at least one SWS. The electro-optic layer can modulate light reflected by the filter over a narrow band portion of a reflective bandwidth of the filter.

Incident light gets separated into two orthogonal polarization states without any substantial absorption by the filter. Accordingly, it is possible to efficiently convert the polarization of one separated beams using a polarization converter. After conversion, a structure for combining beams can be used to recombine the two beams into a single beam, the single beam having approximately the same energy as the incident beam. The combined beam can generate high visibility interference fringes from incident unpolarized light.

A method for forming a polarization filter includes the steps of forming a first sub-wavelength resonant grating structure (SWS) and a second SWS. The SWS are each formed by providing a waveguide and forming the SWS by disposing a plurality of sub-wavelength features in the respective waveguides. The features are positioned with substantially equal spacing, the features formed from a material having a refractive index greater than the waveguide refractive index. The first and second SWS are disposed relative to one another such that a portion of incident light applied to the first SWS passes through the second SWS. The two SWS can share a single unitary waveguide material. Preferably, the features are embedded in the waveguides.

In one embodiment of the method, the waveguide can be provided by selecting at least one mold, the mold having a pattern defining a plurality of features, filling the mold with a liquid, the liquid adapted to produce a solid material following hardening, and hardening the liquid to form the waveguide. The SWS can be formed by filling the plurality of features with a feature material. A method such as chemical vapor deposition (CVD) may be used for this purpose. The liquid is preferably sol gel. Most preferably, the sol gel is a silica gel, the silica gel adapted to form silica after the hardening step. In this embodiment, the method can include the step of disposing the SWS relative to one another such that a portion of incident light applied to the first SWS passes through the second SWS, and annealing after the disposing step, the annealing to create an integrated filter structure. The method can include the step of interposing an optically transparent material between the first and second SWS before the annealing step.

A method for separating orthogonal polarizations of light includes the steps of providing a filter including a first sub-wavelength resonant grating structure (SWS) for receiving incident light, the incident light having orthogonal polarization components, and a second SWS. The SWS are disposed relative to one another such that a portion of incident light applied to the first SWS passes through the second SWS. The interaction of the two SWS results in the filter substantially reflecting one of the orthogonal polarization components while substantially transmitting the other orthogonal polarization component.

The method can preferably include the step of directing the light to be incident substantially normal to a surface of the first SWS. The incident light can include visible light, wherein a reflective bandwidth of the filter includes at least one full color band of light.

Discrete areas of the filter can each produce different resonant reflective responses by pixelating the filter area. In this embodiment, at least one SWS has a plurality of areas defining a plurality of pixels, the method further including the step of producing a resonant reflective response from at least one of the pixels.

The method can also include modulating a resonant reflective response of the filter. The modulating can include the step of modulating the reflected orthogonal polarization component over a narrowband portion of a reflective bandwidth of the filter.

The method can include the step of converting one of the orthogonal polarization components output by the filter into the other orthogonal polarization component. Once converted, the beams can be recombined. Because incident light is separated by the filter into two orthogonal polarization states without any substantial absorption, substantially all incident light can be combined into a single beam, the single beam having a single one of the orthogonal polarization components.

A high Q narrowband filter includes a first sub-wavelength resonant grating structure (SWS) for receiving incident light, and a second SWS, the first and second SWS disposed relative to one another such that incident light which is transmitted by the first SWS passes through the second SWS. The filter has a polarization sensitive resonance. The first and second SWS are spaced apart a distance being at least one half an optical wavelength. The polarization sensitive resonance substantially reflects a first polarization component of the incident light over a broad band of wavelengths except at least one narrow band within the broad band, the narrow band substantially transmitting the first polarization component when the filter spacing distance substantially equals an integer number of half optical wavelengths of the incident light. The filter substantially transmits a second polarization component of the incident light over an entire width of the broad band resonant response, the polarization components being orthogonal to one another.

A method for high Q narrowband filtering includes the steps of providing a filter including a first sub-wavelength resonant grating structure (SWS) for receiving incident light, the incident light having orthogonal polarization components, and a second SWS. The first and second SWS are disposed relative to one another such that a portion of the incident light applied to the first SWS passes through the second SWS. Light is shined on the first SWS. The filter substantially reflects a first polarization component of the incident light over a broad band of wavelengths except at least one narrow band within the broad band. The narrow band substantially transmits the first polarization component when a spacing distance of the first and second SWS substantially equals an integer number of half optical wavelengths of the incident light. The filter substantially transmits a second polarization component of the incident light over an entire width of the broad band.

BRIEF DESCRIPTION OF THE DRAWINGS

A fuller understanding of the present invention and the features and benefits thereof will be accomplished upon review of the following detailed description together with the accompanying drawings, in which:

FIG. 2 is a plot of reflectance vs. wavelength as a function of polarization type for a sub-wavelength polarization filter adapted to process red light.

FIG. 3 is a plot of reflectance vs. wavelength as a function of polarization type for a sub-wavelength polarization filter adapted to process green light.

DETAILED DESCRIPTION OF THE INVENTION

Figure 1:
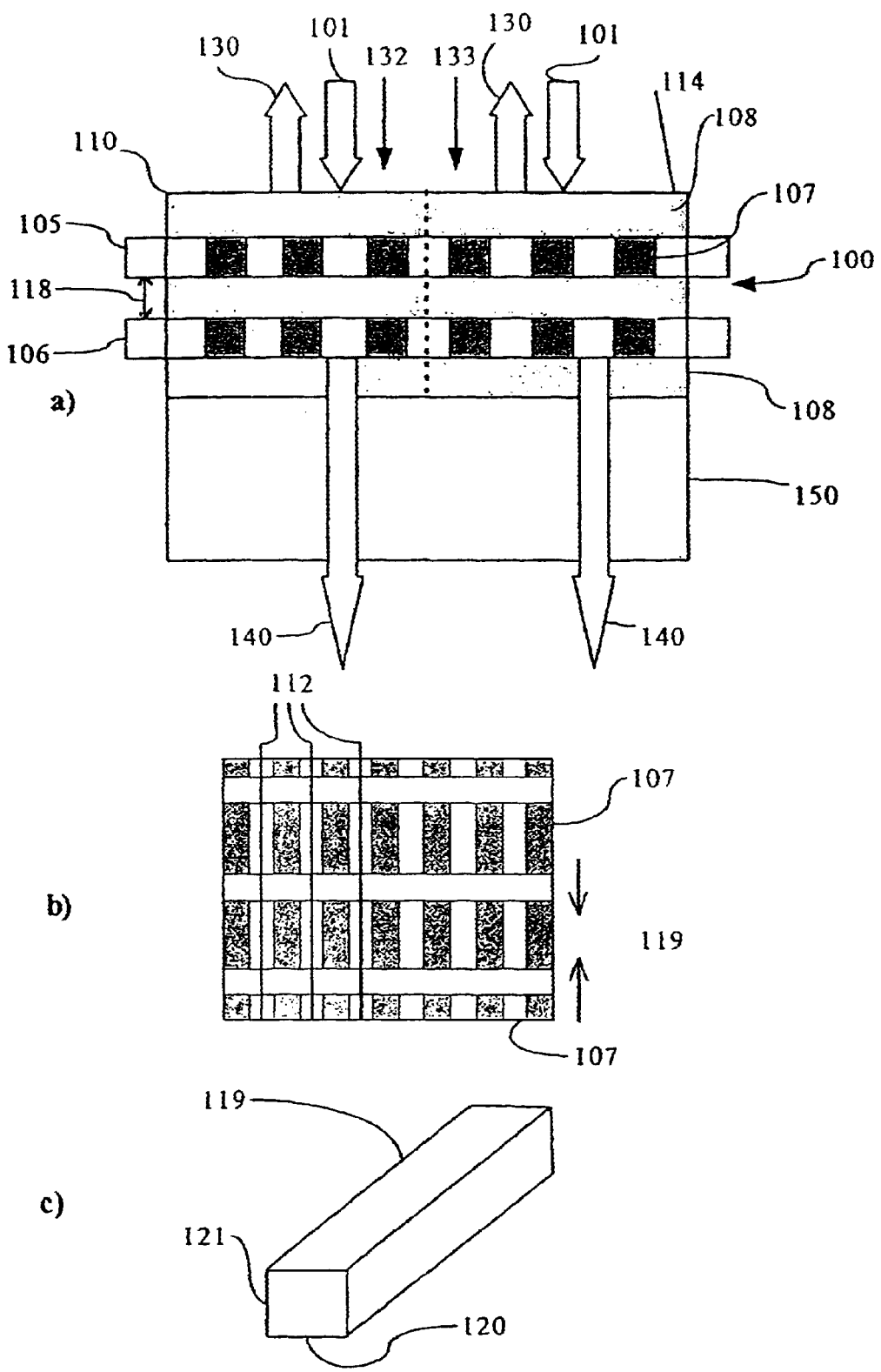
FIG. 1(a) illustrates a cross section of an embodiment of the invention with a sub-wavelength polarization sensitive filter formed from two (2) sub-wavelength structures (SWS) containing features, the SWS disposed relative to one another such that a portion of incident light applied to the first SWS passes through the second SWS.
FIG. 1(b) illustrates a top view of the sub-wavelength polarization filter shown in FIG. 1(a).
FIG. 1(c) illustrates the various physical dimensions of a rail.

Grating structures are generally known in the art to provide a method for dispersing incident electromagnetic wave energy. Sub-wavelength structures (SWS) are a type of optical grating structure.

Optical wavelength may be defined as the wavelength of a electromagnetic (EM) wave in a given material, and is equal to the wavelength of the wave in a vacuum, divided by the refractive index of the material. As the period of the grating approaches the optical wavelength of the incident radiation, the diffracted orders begin propagating at increasingly larger angles relative to the surface normal of the grating. Eventually, as the grating period is reduced and approaches the optical wavelength of the incident radiation, the angle of diffraction approaches 90 degrees, resulting in the propagation of the radiation being confined to the plane of the grating. This sub-wavelength condition effectively couples the electromagnetic fields of the incident radiation within the grating structure, a direction which is transverse to a surface normal drawn from the grating surface.

An example of the formation and use of a sub-wavelength grating structure is described in U.S. Pat. No. 6,035,089, by Grann, et. al. ("Grann"), the disclosure of which is hereby incorporated fully by reference. Grann describes a single sub-wavelength grating structure (SWS) that uses periodically spaced high refractive index features, such as "posts", embedded in a lower refractive index dielectric waveguide material to form an extremely narrowband resonant reflector.

A sub-wavelength grating structure which functions as a zeroth order diffraction grating can be represented by a uniform homogeneous material having an effective refractive index (neff). Under particular incident wave configurations, such as a substantially normal incident beam, and certain structural constraints, such as the refractive index of the medium surrounding the SWS grating being less than the refractive index of the waveguide material being less than the refractive index of the post material, a SWS may exhibit a resonance anomaly which results in a strong reflected beam over an extremely narrow bandwidth. If the incident radiation is not within the SWS resonant bandwidth, most of the energy of the incident beam will propagate through the SWS in the form of a transmitted beam.

This resonance phenomenon occurs when electromagnetic radiation is trapped within the grating material due to total internal reflection. If this trapped radiation is coupled into one or more resonant modes (guided mode) of the SWS grating, the field will resonate and redirect substantially all of the electromagnetic energy backwards. This resonance effect results in a nearly total reflection of the incident field from the SWS surface, which may be designed to be extremely sensitive to wavelength.

Grann's embedded grating structure results in minimal sideband reflections. Since Grann's resonant structure is buried within a waveguide, both the input and output regions of the grating share the same refractive index, resulting in minimal or no Fresnel reflection losses.

The invention uses SWSs to generate high efficiency, polarization selective transmission and reflection sub-wavelength filters (hereafter SWEP filters). The SWEP filters can be made to exhibit a broadband reflective response, the reflective response capable of being centered over a wide range of wavelengths. Although primarily described for visible light applications, SWEP filters can be configured for UV and IR applications through selection of sufficiently non-absorbing materials for the wavelength ranges of interest (e.g. substantially non-absorbing dielectric waveguide and post materials) and appropriate feature geometries to produce the desired sub-wavelength effects.

Although one SWS (Grann) can act as a narrowband reflector, the combination of two SWS disposed relative to one another such that a portion of incident light applied to the first SWS passes through the second SWS (SWEP), can produce a broadband reflective response which can be substantially limited to a single polarization. It is noted that SWEP filters can also be formed from more than two (e.g. three) SWS disposed relative to one another such that a portion of incident light applied to the first SWS passes through the other SWS.

Being substantially limited to a single polarization may be defined as a spectral response which produces a reflected beam having at least 99% of a single polarization. The electrical field vector of the light reflected by the SWEP filter is parallel to the longer dimension of the features making up the SWS, while the electrical field vector of the light transmitted by SWEP is perpendicular to the longer dimension of the features making up the SWS. Such a filter may be referred to as polarization sensitive over its bandwidth, where one orthogonal polarization component of incident light is substantially transmitted, while the other orthogonal polarization is substantially reflected.

For a single SWS to become resonant and highly reflective it must first have its evanescent wave coupled into one or more allowed waveguide modes (guided modes). Next, the periodicity of the SWS must be such that the guided wave gets re-coupled into a reflected wave. Different wavelengths of light produce different evanescent waves, each capable of coupling into different waveguide modes. The particular SWS geometry and the surrounding materials determine which guided modes can be sustained, and accordingly those capable of generating a resonant reflection.

If a broadband SWEP design is desired using the invention, the periodicity and feature thicknesses should be configured to couple (sustain) as many waveguide modes into the SWS structure as possible. Hereinafter, SWS features will generally be referred to as rails, the rails having an elongated length dimension relative to the width of the feature.

The number of guided modes allowed depends on the index of refraction of the various materials making up the SWS (e.g. waveguide, rails) as well as SWS geometrical parameters (e.g. rail spacing, fill factor, and feature depth). Fill factor is defined as the percentage of an SWS layer that includes high index rail material, as opposed to low index waveguide material. For example, a 50% fill factor refers to an SWS layer having 50% high index rail material and 50% low index waveguide material.

Two SWS structures disposed relative to one another such that a portion of incident light applied to the first SWS passes through the second SWS can act as a resonator for wavelengths of light where an integral number of half optical wavelengths is equal to the SWS spacing distance. If the spacing distance between the SWS pair were to be equal to one half an optical wavelength (or any integer multiple thereof), a narrowband (high Q) Fabry-Perot transmission effect would generally result for the wavelengths of light satisfying the resonance condition.

If it is desired to prevent the Fabry-Perot transmission effect, the SWS layers should generally be spaced apart a distance which is less than one half an optical wavelength apart. If the SWS separation distance is less than one half an optical wavelength, no constructive cavity resonance can occur. Accordingly, the two SWS layers will permit normal SWEP operation being reflection of a single polarization of light while transmitting the other polarization of light, the reflection and transmission over a band of wavelengths.

If the SWS layers are spaced apart a distance greater than one half an optical wavelength, the SWEP filter will act as a high "Q" resonant cavity passing a very narrow sub-band of light, having utility as a high Q narrowband filter. This polarization transmission within the otherwise highly reflective band is still small since the Q of the resonant cavity formed by the SWS pair is generally very high (>10,000) and the overall polarization separation efficiency (for a broad band source) should still approach approximately 99%.

Referring to FIG. 1(a), a cross section of a SWEP filter 100 configured as a broadband sub-wavelength polarization filter is shown in accordance with an embodiment of the invention. SWEP 100 is formed from two (2) SWS 105 and 106, the SWS disposed relative to one another such that a portion of incident light applied to the first SWS passes through the second SWS, the first and second SWS disposed in a spaced apart relation by a spacing distance 118. SWS 105 and 106 are preferably formed from a plurality of high index sub-wavelength rails 107 within a waveguide material 108, the waveguide material 108 shown as common for both SWS 105 and 106. Although the waveguide materials shown in FIG. 1(a) are the same for both SWS 105 and 106, different waveguide materials may generally be selected for each SWS in the SWS pair. The same material can be chosen to facilitate fabrication.

Moreover, each SWS 105 and 106 can also be formed from a different rail material. Rail spacing, also referred to rail period, may be measured between analogous periodic rail portions, such as center to center, as shown as reference 114. Incident light 101 having orthogonal polarization components is shown normally incident on the surface 110 of SWEP 100. SWEP 100 can separate incident light 101 into orthogonal polarization components. The reflected light is polarized such that its electric field vector is parallel to the length of the SWS rails 107 and the transmitted light is polarized such that its electric field vector is perpendicular to the length of the SWS rails 107. Incident light 101 can include, but is not limited to, linear, unpolarized, circularly, and elliptically polarized incident light.

An advantage of the invention is that SWEP 100 can function at normal incidence (zero degrees), while other polarization filters (e.g. Brewster type) generally cannot. However, SWEP filter 100 performance is expected to be adversely affected for increasingly large angles of incident light 101. As the angle of incidence increase beyond several degrees from normal incidence, the orthogonal polarization which is generally substantially transmitted by SWEP 100 over its band width (at certain wavelengths) will increasingly be reflected instead of transmitted while some of the generally reflected orthogonal polarization of light will increasingly be transmitted instead of reflected (i.e. crosstalk). The greater the angular difference from the normal, generally, the larger the amount of crosstalk.

Subwavelength rail features 107 can be formed using various fill factors, depths, and periodicities provided the resulting inter-feature (rail) spacing distances remain sub-wavelength and resonant for the desired wavelengths of incident light. In one embodiment, rails 107 are disposed within dielectric waveguide 108, the rails formed from material having a refractive index greater than the waveguide material refractive index. Referring to FIG. 1(c), rails 107 are characterized as having a length 119, width 120 and thickness 121. It is estimated that rails 107 should preferably be approximately at least 4–10 sub-wavelength periods long and the "correct" boundary conditions satisfied by the SWS 105 and 106 for proper SWEP 100 operation. If correct boundary conditions are provided, SWEP 100 may operate properly having rail lengths being approximately 2–4 sub-wavelength periods long.

Correct (or ideal) boundary conditions exist when the reflected boundary energy (internal to the sub-wavelength structure) produces an in-phase reflection from the boundary. Such a response makes the finite extent of the SWS appear to be semi-infinite to an incident electromagnetic wave. For dielectric materials, such as a SWS formed from a dielectric waveguide having embedded high index rails 107, the boundary should preferably satisfy the boundary condition at the respective low index waveguide at the material midpoints between the high index rails 107, shown as lines 112 in FIG. 1(b).

Referring again to FIG. 1(a), in normal operation, light with its electrical field vector parallel to the length of th SWS rails 107 is substantially reflected as a reflected beam 130 by SWEP 100, while light with its electrical field vector perpendicular to the length of SWS rails 107 is substantially transmitted as a transmitted beam 140. FIG. 1(a) shows the SWEP including an optional glass layer 150 for receiving the transmitted beam 140. The SWEP 100 produces a polarization sensitive response because light components which are polarized having an electrical field vector aligned with the length of the rails 107 are substantially reflected by SWEP 100, while light having an electrical field polarized orthogonal to the length of the rails 107 is substantially transmitted by SWEP 100.

Referring now to FIG. 2, a typical reflectance vs. wavelength plot for SWEP 100 is shown. A broadband reflective response is shown having nearly 100% reflectivity for light having its electrical field vector parallel to the length of SWS rails 107 from approximately $0.6\mu$ to $0.65\mu$. This flat response region 210, can be contrasted with sloped regions 215, where the reflectivity varies with wavelength. It is noted that although SWEP 100 is normally operated in flat region 210, there may be some applications for SWEP 100 in the sloped regions 215. For example, the wavelengths corresponding to the sloped regions 215 of a given SWEP reflective response can be used for intensity modulation applications. In this embodiment, additional structure would preferably be provided, such as an electro-optic material and electrodes, which could add some complexity to the SWEP 100 architecture.

Although respective analogous sub-wavelength rails 107 for each SWS are shown aligned in FIG. 1(a), the operation of SWEP 100 filter should not be significantly affected by misalignment of sub-wavelength rails 107 between rails 107 of respective SWS 105 and 106. Since SWS are sub-wavelength structures, it is the rail periodicity and average index of refraction of the SWS layers that are important for proper SWEP 100 operation, rather than the degree of relative alignment of the rails 107. It is expected that SWEP 100 performance will be largely invariant to misalignment of rails 107 between respective SWS 105 and 106 provided the offset distance is less than the wavelength of incident light. Otherwise the non-uniformity can cause the SWEP structure to no longer be sub-wavelength relative to the incident light.

It is preferable to form SWS pairs 105 and 106 which have very similar or preferably nearly identical rail dimensions, rail spacing 114 and related fill factors. If these factors significantly differ between the SWS pair, the filtering properties of SWEP 100 may be degraded.

As noted earlier, the SWS spacing distance 118 can be set to a distance less than an integral number of half optical wavelengths if it is desired to prevent formation of a resonator. To realize red light polarization sensitive operation, SWEP 100 can be made from two (or more) SWS, the SWS formed from a $MgF_2$ waveguide (nf=1.38 at $0.6\mu$) having two sets of ZnS (nf=2.6 at $0.6\mu$) rails disposed within the waveguide, the SWS spacing distance 118 being 340 nm apart. The two sets of rails shown in FIGS. 1(a) and (b) for each SWS are designed to have the same feature periodicity 114, feature dimensions (length 119, width 120 and thickness 121 ) and fill factors. Using ZnS rails having a periodicity of 430 nm, and a 50% fill factor, feature dimensions being a square cross section (width 120 and thickness 121 each being equal to 215 nm) and an infinite length 119, a broadband sub-wavelength polarization sensitive filter having a response centered at the red band results as shown in FIG. 2. It is noted that rail length 119 need not be infinite or semi-infinite, only on the order of at least several sub-wavelength periods.

Referring to FIG. 2, the spectral response of the SWEP 100 can be characterized as a polarization sensitive red filter. In the full red band 210 (approximately 600 to 650 nm), virtually all light with its electrical field vector parallel to the SWS rails 107 is reflected, while virtually all light with its electrical field vector perpendicular to the SWS rails 107 is transmitted. Accordingly, the SWEP filter shown in FIG. 2 can be properly characterized as being substantially reflective for one orthogonal polarization of light (the polarization having an electrical field vector parallel to rail 117 length) over a full color band of light, while at the same time being substantially transmissive for the other orthogonal polarization component.

By making slight changes to SWS parameters such as the rail periodicities 114, fill factors, and SWS spacing 118, SWEP 100 can be designed to have broadband polarization sensitivity to other bands of light, such as green or blue bands of light. As used herein, "light" means not only signals in the spectrum of visible light, but also signals in the full spectrum of frequencies typically handled by optical transmission systems (e.g. ultraviolet, infrared, etc.).

SWEP filters can be configured to be polarization sensitive for a portion of or a full particular color band (e.g. red band, green band, or blue band), or multiple color bands. FIG. 3 shows the spectral response of a filter that can be characterized as a polarization sensitive green filter. The green filter shown in FIG. 3, used the same waveguide and feature material used to produce the spectral response of the polarization sensitive red filter shown in FIG. 2. The green filter used an SWS spacing distance 118 being 320 nm apart. The two sets of rails shown in for each SWS have the same feature periodicity 114, feature dimensions being width=160 nm and thickness=160 nm and fill factor of 50%. The rail length 119 was set as infinite. In the full green band 310 (approximately 505 to 560 nm), virtually all light with its electrical field vector parallel to the length of the SWS rails 107 is reflected, while virtually all light with its electrical field vector perpendicular to the length of SWS rails 107 is transmitted.

Figure 4:
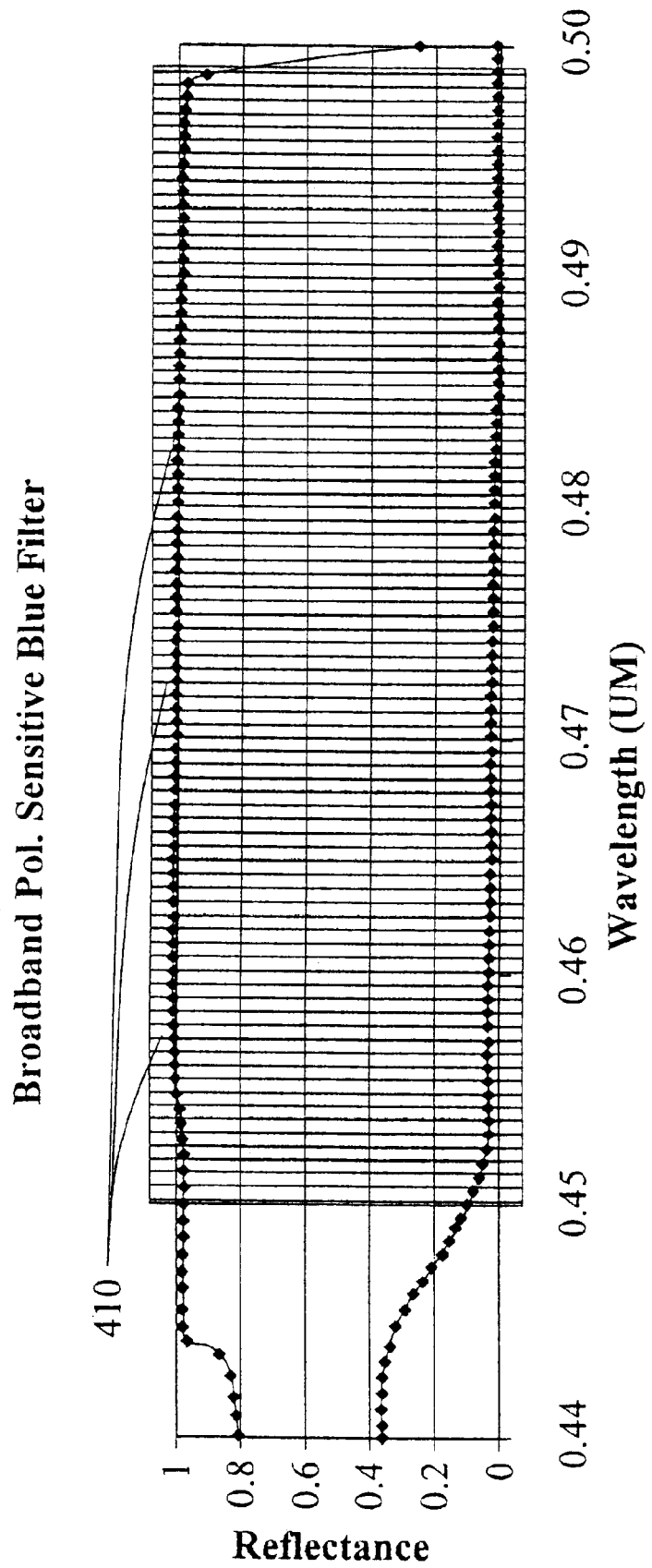
FIG. 4 is a plot of reflectance vs. wavelength as a function of polarization type for a sub-wavelength polarization filter adapted to process blue light.

Similarly FIG. 4 shows the spectral response of a filter that can be characterized as a polarization sensitive blue filter. The blue filter shown in FIG. 4, used the same waveguide and feature material used that produced the spectral response of the polarization sensitive red filter shown in FIG. 2 and green filter shown in FIG. 3. The blue filter used an SWS spacing distance 118 being 260 nm apart. The two sets of rails shown in for each SWS have the same feature periodicity 114, feature dimensions being width=160 nm, thickness=160 nm and fill factor of 48%. The rail length 119 was set as infinite. In the full blue band 410 (approximately 490 to 499 nm), virtually all light with its electrical field vector parallel to the length of SWS rails 107 is reflected, while virtually all light with its electrical field vector perpendicular to the length of SWS rails 107 is transmitted.

The center reflective wavelength of the SWEP reflective response can be set by an appropriate choice of structural parameters. A center reflective wavelength ($\lambda_c$) for a SWEP filter may be roughly approximated by the following relation:

$$\lambda_c \approx 0.8 * (\text{rail periodicity}) * (n_r + n_{fill})/2$$

Thus, $\lambda_c$ is approximately 0.8× (rail periodicity 114× average rail area index of refraction). Where $n_r$ is the refractive index of the rail material and $n_{fill}$ is the refractive index of the waveguide material, the average refractive index being a weighted average based on the fill factor. The above equation is preferably applied when the rail depth 121 is approximately ½ the rail periodicity 114, and the SWS spacing 118 being approximately 80% of the rail periodicity 114. Other quantitative techniques may be used to determine a set of appropriate SWEP 100 parameters to configure SWEP 100 to have a desired center reflective wavelength value.

The invention can add modulation capability, such as through the addition of an EO layer (not shown) in optical contact with the SWEP 100. The term optical contact, as used herein, refers to proximity such that electromagnetic waves propagating within SWEP100 extend into a given layer. By adding an EO layer (with electrodes), for example, SWEP 100 can be used to modulate light reflected by SWEP 100 over a narrowband portion of the reflective bandwidth of SWEP 100. The modulation effect on the other transmitted orthogonal polarization component of light is expected to be less significant.

A polarization converter (e.g. quarter wave plate plus a reflector, not shown) can be added to convert one of the two orthogonal polarization components output by SWEP 100 into the other orthogonal polarization component. After the polarization is converted, the beams can be combined by a suitable apparatus into a single beam having a single polarization component. Since the incident light gets separated into two orthogonal polarization states without any substantial absorption by SWEP 100, the energy of the combined substantially single polarization beam can approach the energy of the incident light which had two orthogonal polarization components. When the two beams are combined, the beams can interfere with each other if the coherence length of the incident light is greater than the path length difference. This combination can act as an interferometer, with the interference pattern related to the optical path differences of the two wave fronts. If the coherence length is shorter that the path difference, an additive intensity effect can result with substantially all the entire incident light being converted to one polarization state.

In yet another embodiment of the invention, discrete areas of the SWEP surface can constitute pixels 132 and 133, by providing different local post periodicities, fill factors and/or SWS spacing. By providing a structure reflecting boundary energy (internal to the sub-wavelength structure) to produce an in phase reflection from the low index waveguide material at the midpoint between the high index rails 107, pixelization of the SWEP surface can result. Pixelization of the SWEP 100 surface area into pixels 132 and 133 allows SWEP 100 to exhibit a distinct resonant reflective response from each pixel.

In another embodiment of the invention, a method for forming a broadband SWEP filter includes the steps of forming a first and a second SWS, wherein the two SWS are disposed relative to one another such that a portion of incident light applied to the first SWS passes through the second SWS, such as stacked on one another. The particular manufacturing process used for fabricating the SWEP 100 should preferably be inexpensive and reproducible.

Conveniently, SWS used in the invention can be carried out by using any standard integrated optics manufacturing or electronic integrated circuit manufacturing method.

One method of producing SWEP filters takes advantage of sol-gel processing. Sol gel is a silica with excellent optical characteristics, especially when compared to plastics. The sol gel process begins with liquid (sol), which is poured (casted) into a mold where it gels and then ages to increase in strength. Removal from molds and subsequent drying and heat treatment produce porous or dense silica glass. One such sol is marketed under the trade name "GELSIL"®, manufactured by the GelTech Corporation, Orlando, Fla.

Figure 5:
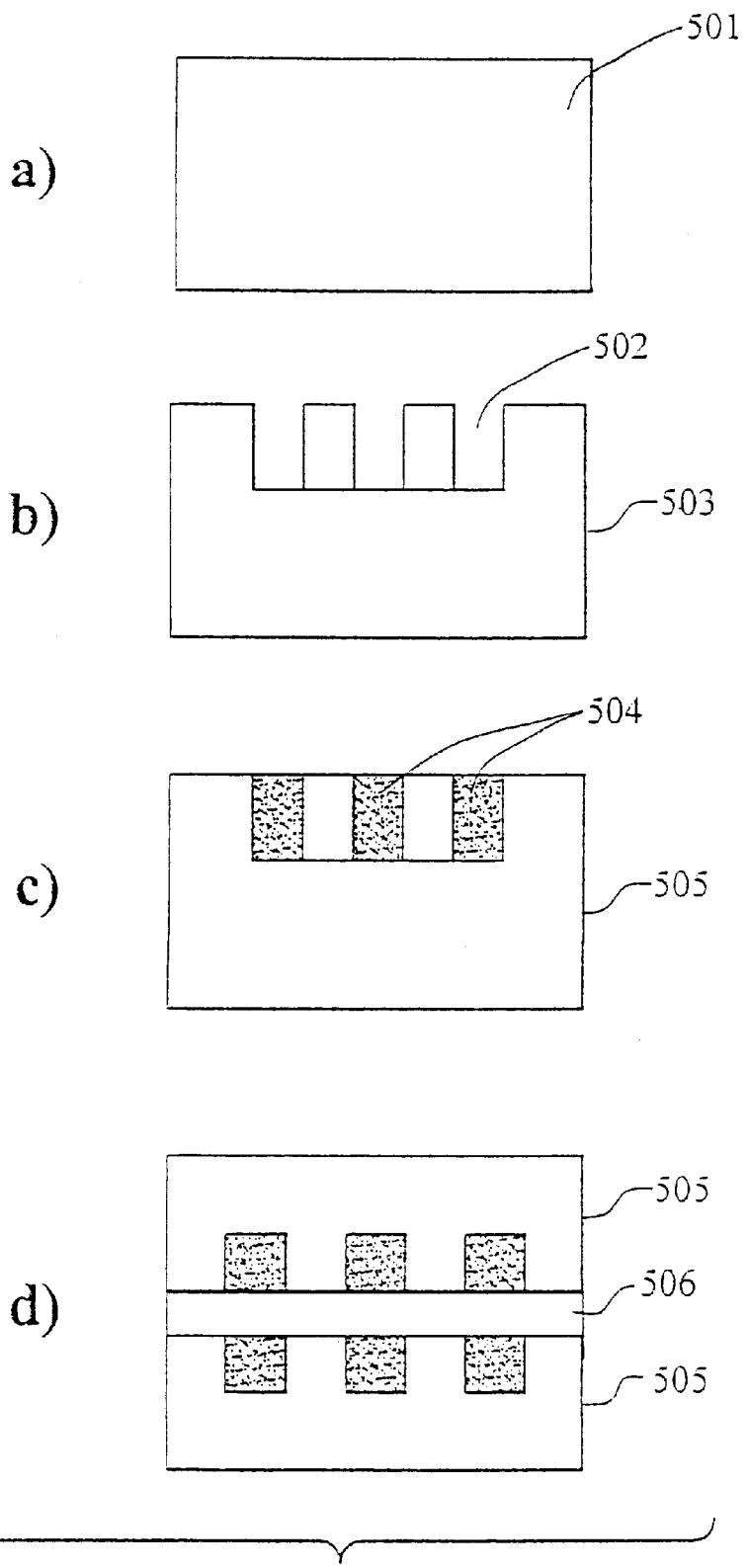
FIG. 5 illustrates a portion of a process to form a sub-wavelength polarization filter.

To produce clear aperture polarizing filters, GELSIL® may be used instead of dielectric waveguide materials such as $MgF_2$. Since the sub-wavelength polarizing filter is symmetrical, replicated sol gel blanks with rails can be fabricated using the sol gel process as shown in FIG. 5. In step 5(a), a gel casted blank is formed by casting sol in a mold to form a silica blank 501. In step 5(b), "rail" features 502 can be formed in the blank 501 by diamond turning into a mold pin which could then be used to produce patterned silica blanks 503 in a process capable of high volume production. In step 5(c), Zinc sulfide (ZnS) or other high refractive index rail material (relative to the silica) can be subsequently provided into the rail features 502 using a suitable technique, to form sub-wavelength features 504, such as by chemical vapor deposition (CVD) process, or other suitable method to form SWS 505. The surface can then be preferably polished. In the final assembly step 5(d), two (2) SWS 505 can be aligned so that the SWS are disposed relative to one another such that a portion of incident light applied to the first SWS passes through the second SWS, such as through use of alignment marks. During alignment, a non-patterned blanks of fused silica 506 (for example) is preferably sandwiched between the SWS 505 and 506 to provide the desired spacing distance between respective SWS. Finally, the sandwich structure can be annealed in step 530 (not shown) to form a complete integrated SWEP filter.

The invention can be used in a wide variety of systems and for a variety of applications. For example, the invention can be used as an optical modulators, high efficiency optical isolators, and high efficiency normal incident polarization beam splitters.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We claim:

1. A polarization filter, comprising:
   a first sub-wavelength resonant grating structure (SWS) for receiving incident light, and
   a second SWS, said first and second SWS optically coupled through a dielectric waveguide coupling section, said coupling section exclusive of any reflective structures therein, said filter having a polarization sensitive resonance, said polarization sensitive resonance substantially reflecting a first polarization component of incident light while substantially transmitting a second polarization component of said incident light, said polarization components being orthogonal to one another.

2. The filter of claim 1, wherein a length of said coupling section is a subwavelength distance, said subwavelength distance being greater than one half an optical wavelength.

3. The filter of claim 1, wherein said polarization sensitive resonance produces a reflected beam comprising at least 99% of said first polarization component or at least 99% of said second polarization component.

4. The filter of claim 1, wherein said first and second SWS are formed from respective first and second pluralities of sub-wavelength features having a length dimension and a shorter width dimension, said plurality of features disposed in respective dielectric waveguide materials.

5. The filter of claim 4, wherein said first and second plurality of features have a higher refractive index as compared to said respective dielectric waveguide materials.

6. The filter of claim 4, wherein a single common dielectric waveguide material provides said dielectric waveguide coupling section and said respective dielectric waveguide materials.

7. The filter of claim 4, wherein said filter reflects substantially all said incident light having an electrical field vector parallel to said lengths and transmits substantially all said incident light having an electrical field vector perpendicular to said lengths.

8. The filter of claim 1, wherein said incident light is visible light, wherein said substantially transmitting and said substantially reflecting are provided over at least one full color band of said visible light.

9. The filter of claim 1, wherein said filter has a plurality of areas defining a plurality of pixels, said plurality of pixels each adapted to produce a configurable resonant reflective response.

10. The filter of claim 1, further comprising a structure for modulating a resonant reflective response of said filter.

11. The filter of claim 10, wherein said structure for modulating includes at least one electro-optic layer, said at least one electro-optic layer disposed in optical contact with at least one of said SWS.

12. The filter of claim 11, wherein said electro-optic layer modulates light reflected by said filter over a narrowband portion of a reflective bandwidth of said filter.

13. The filter of claim 1, further comprising a polarization converter for converting one of said polarization components output by said filter into said other polarization component.

14. The filter of claim 13, further comprising structure for combining said transmitted and said reflected polarization components, wherein substantially all said incident light is converted into a single beam having a single one of said polarization components.

15. A method for forming a polarization filter, comprising the steps of:
   providing a first waveguide having a first refractive index;
   forming a first SWS in said first waveguide, said first SWS formed by disposing a first plurality of sub-wavelength features in said first waveguide with a substantially equal spacing, said first plurality of features formed from material having a refractive index greater than said first refractive index;
   providing a second waveguide having a second refractive index, and
   forming a second SWS in said second waveguide, said second SWS formed by disposing a plurality of sub-wavelength features in said second waveguide with a substantially equal spacing, said second plurality of features formed from material having a refractive index greater than said second refractive index,
   said first and second SWS optically coupled through a dielectric waveguide coupling section, said coupling section exclusive of any reflective structures therein, wherein said filter provides a polarization sensitive resonance, said polarization sensitive resonance substantially reflecting a first polarization component of incident light while substantially transmitting a second polarization component of said incident light, said polarization components being orthogonal to one another.

16. The method of claim 15, wherein said first and second waveguide and said dielectric waveguide coupling section are included as part of a single unitary waveguide material.

17. The method of claim 15, wherein said polarization sensitive resonance produces a reflected beam comprising at least 99% of said first polarization component or at least 99% of said second polarization component.

18. The method of claim 15, wherein said providing comprises the steps of:

selecting at least one mold, said mold having a pattern defining a plurality of features;

filling said mold with a liquid, said liquid adapted to produce a solid material following hardening, and hardening said liquid to form said waveguides.

19. The method of claim 18, wherein said forming comprises the step of filling said plurality of features with a feature material.

20. The method of claim 18, wherein said liquid is sol gel.

21. The method of claim 20, wherein said sol gel is a silica gel, said silica gel adapted to form silica after said hardening step.

22. The method of claim 19, further comprising the step of disposing said SWS relative to one another such that a portion of incident light applied to the first SWS passes through said second SWS.

23. The method of claim 22, further comprising an annealing step after said disposing step, said annealing step to create an integrated filter structure.

24. The method of claim 23, further comprising the step of interposing an optically transparent material between said first and second SWS before said annealing step.

25. A method for separating orthogonal polarizations of light, comprising the steps of:

providing a filter comprising: a first sub-wavelength resonant grating structure (SWS) for receiving incident light, said incident light having orthogonal polarization components, and a second SWS, said first and second SWS optically coupled through a dielectric waveguide coupling section, said coupling section exclusive of any reflective structures therein, wherein said filter substantially reflects one of said orthogonal polarization components and substantially transmits the other of said orthogonal polarization components;

shining said incident light on said first SWS, and substantially reflecting one of said orthogonal polarization components and substantially transmitting the other of said orthogonal polarization components.

26. The method of claim 25, wherein said substantially reflecting step provides a reflected beam comprising at least 99% of either one of said orthogonal polarization components.

27. The method of claim 25, wherein said incident light includes visible light, wherein a reflective bandwidth of said filter includes at least one full color band of light.

28. The method of claim 27, wherein at least one of said SWS have a plurality of areas defining a plurality of pixels, further comprising the step of producing a resonant reflective response from at least one of said plurality of pixels.

29. The method of claim 25, further comprising modulating a resonant reflective response of said filter.

30. The method of claim 29, wherein said modulating includes modulating said reflected orthogonal polarization component over a narrowband portion of a reflective bandwidth of said filter.

31. The method of claim 25, further comprising the step of converting one of said orthogonal polarization components output by said filter into said other orthogonal polarization component.

32. The filter of claim 31, further comprising the step of recombining said transmitted and said reflected orthogonal polarization components, wherein substantially all said incident light is combined into a single beam having a single one of said orthogonal polarization components.

33. A high Q narrowband filter, comprising:

a first sub-wavelength resonant grating structure (SWS) for receiving incident light, and a second SWS, said first and second SWS optically coupled through a dielectric waveguide coupling section, said coupling section exclusive of any reflective structures therein, said filter having a polarization sensitive resonance; wherein said coupling section has a length of at least one half an optical wavelength, said polarization sensitive resonance substantially reflecting a first polarization component of said incident light over a broad band of wavelengths except at least one narrow band within said broad band, said narrow band substantially transmitting said first polarization component when said filter spacing distance substantially equals an integer number of said half optical wavelengths of said incident light, said filter substantially transmitting a second polarization component of said incident light over an entire width of said broad band, said polarization components being orthogonal to one another.

34. A method for high Q narrowband filtering, comprising the steps of:

providing a filter comprising: a first sub-wavelength resonant grating structure (SWS) for receiving incident light, said incident light having orthogonal polarization components, and a second SWS, said first and second SWS optically coupled through a dielectric waveguide coupling section, said coupling section exclusive of any reflective structures therein;

substantially reflecting a first polarization component of said incident light over a broad band of wavelengths except at least one narrow band within said broad band, said narrow band substantially transmitting said first polarization component when a spacing distance of said first and second SWS substantially equals an integer number of half optical wavelengths of said incident light, and substantially transmitting a second polarization component of said incident light over an entire width of said broad band.

* * * * *